United States Patent
Hegge

(10) Patent No.: US 8,902,779 B2
(45) Date of Patent: Dec. 2, 2014

(54) BASE STATION, WIRELESS COMMUNICATION SYSTEM, AND WIRELESS COMMUNICATION METHOD

(71) Applicant: Fujitsu Limited, Kawasaki (JP)

(72) Inventor: Stephan Hegge, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/625,966

(22) Filed: Sep. 25, 2012

(65) Prior Publication Data

US 2013/0121182 A1 May 16, 2013

(30) Foreign Application Priority Data

Nov. 14, 2011 (JP) .................................. 2011-249119

(51) Int. Cl.
*H04W 52/00* (2009.01)
*H04W 36/14* (2009.01)
*H04W 36/06* (2009.01)
*H04W 88/10* (2009.01)
*H04W 60/00* (2009.01)

(52) U.S. Cl.
CPC .............. *H04W 36/14* (2013.01); *H04W 36/06* (2013.01); *H04W 88/10* (2013.01); *H04W 60/00* (2013.01)
USPC ........... 370/252; 370/311; 370/318; 370/328; 455/422.1; 455/522; 726/4

(58) Field of Classification Search
None
See application file for complete search history.

(56) References Cited

U.S. PATENT DOCUMENTS

| | | | |
|---|---|---|---|
| 8,443,420 B2 * | 5/2013 | Brown et al. ...................... 726/3 |
| 2007/0189321 A1 * | 8/2007 | Lee et al. ...................... 370/445 |
| 2007/0256121 A1 * | 11/2007 | Hassan et al. ...................... 726/5 |
| 2008/0227447 A1 | 9/2008 | Jeong et al. |
| 2009/0042594 A1 | 2/2009 | Yavuz et al. |
| 2009/0042595 A1 | 2/2009 | Yavuz et al. |
| 2009/0196221 A1 | 8/2009 | Horn et al. |
| 2011/0053592 A1 | 3/2011 | Chun |
| 2013/0172001 A1 * | 7/2013 | Gerlach et al. ................ 455/450 |

FOREIGN PATENT DOCUMENTS

| | | |
|---|---|---|
| JP | 2010-16602 | 1/2010 |
| JP | 2010-93775 | 4/2010 |
| JP | 2010-512101 | 4/2010 |
| JP | 2010-536309 | 11/2010 |
| JP | 2010-536311 | 11/2010 |
| JP | 2011-50057 | 3/2011 |
| JP | 2011-511557 | 4/2011 |

* cited by examiner

*Primary Examiner* — Chi Pham
*Assistant Examiner* — Shick Hom
(74) *Attorney, Agent, or Firm* — Katten Muchin Rosenman LLP

(57) ABSTRACT

A base station including: a first antenna for a first wireless communication, a second antenna for a second wireless communication, and a processor to receive a request from a registered mobile terminal that is registered with the base station, to communicate with the registered mobile terminal by using the first wireless communication in accordance with the request, and to control a non-registered mobile terminal that is not registered with the base station, so as to communicate with the base station by using the second wireless communication, when the non-registered mobile terminal communicates with the base station by using the first wireless communication and a condition of a communication performed by the base station is not satisfied.

12 Claims, 16 Drawing Sheets

FIG. 9

| COMMUNICATION SCHEME | MAXIMUM THROUGHPUT | ACCESS DELAY | QoS SUPPORT | POWER CONSUMPTION |
|---|---|---|---|---|
| BLUETOOTH | 2Mbps | 25ms | YES | 2mW |
| LTE | 50Mbps | 10ms | NO | 10mW |
| WIRELESS LAN | 100Mbps | 5ms | YES | 20mW |

| COMMUNICATION SCHEME | POWER CONSUMPTION IN IDLE MODE | ACCESS TIME | NUMBER OF CONNECTED MOBILE TERMINALS | NUMBER OF OPEN SPOTS |
|---|---|---|---|---|
| BLUETOOTH | 0.02mW | 200ms | 2 | 10 |
| LTE | 0.5mW | 70ms | 0 | 4 |
| WIRELESS LAN | 1mW | 50ms | 8 | 20 |

FIG. 15

| COMMUNICATION SCHEME | MAXIMUM SPEED | ACCESS DELAY | QoS SUPPORT | NUMBER OF CONNECTED MOBILE TERMINALS |
|---|---|---|---|---|
| WIRELESS LAN | 100Mbps | 5ms | YES | 8 |
| BLUETOOTH | 2Mbps | 25ms | YES | 2 |
| LTE | 50Mbps | 10ms | NO | 0 |

BASE STATION, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2011-249119, filed on Nov. 14, 2011, the entire contents of which are incorporated herein by reference.

FIELD

The embodiments discussed herein relate to base stations, wireless communication systems, and wireless communication methods.

BACKGROUND

In recent years, in order to improve indoor communication environments and network capacity, femto base stations, which have a smaller communication area than conventional macro base stations, have become widely used. Femto base stations are not limited to long term evolution (LTE) and third generation (3G) wireless communication schemes and femto base stations have also been proposed that are also capable of providing communication using WiFi (registered trademark) and bluetooth wireless communication schemes. Usually, in order to secure a certain level of communication quality and security, femto base stations restrict what mobile terminals are allowed to connect thereto. Examples of methods of restriction include a closed subscriber group (CSG) method in which only mobile terminals that are registered with the femto base station (hereafter, referred to as "subscribers") are allowed to connect to the femto base station, and a hybrid operation mode (HOM) method in which subscribers and mobile terminals that are not registered with the femto base station (hereafter, referred to as "guests") are discriminated between before being allowed to connect to the femto base station. Among these methods, it is desirable that a femto base station adopt the latter HOM method from the viewpoint of decreasing interference from mobile terminals connected to a macro base station in the vicinity of the femto base station as much as possible.

Examples of the related art include Japanese National Publication of International Patent Application No. 2010-536309, Japanese National Publication of International Patent Application No. 2010-536311, Japanese National Publication of International Patent Application No. 2010-512101, Japanese Laid-open Patent Publication No. 2010-16602, Japanese Laid-open Patent Publication No. 2010-93775, Japanese Laid-open Patent Publication No. 2011-50057, Japanese National Publication of International Patent Application No. 2011-511557.

SUMMARY

According to an aspect of the invention, a base station including: a first antenna for a first wireless communication, a second antenna for a second wireless communication, and a processor to receive a request from a registered mobile terminal that is registered with the base station, to communicate with the registered mobile terminal by using the first wireless communication in accordance with the request, and to control a non-registered mobile terminal that is not registered with the base station, so as to communicate with the base station by using the second wireless communication, when the non-registered mobile terminal communicates with the base station by using the first wireless communication and a condition of a communication performed by the base station is not satisfied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG.

FIG.

FIG.

FIG.

FIG.

FIG.

FIG.

FIG.

FIG.FIG. 9 illustrates an example of a list of communication schemes according to Embodiment 2;

FIG.

FIG.

FIG.

FIG.FIG. 13 illustrates an example of a list of communication schemes according to Embodiment 3;

FIG.

FIG.FIG. 15 illustrates an example of a list of communication schemes according to Embodiment 4;

FIG.

DESCRIPTION OF EMBODIMENTS

Figure 1:
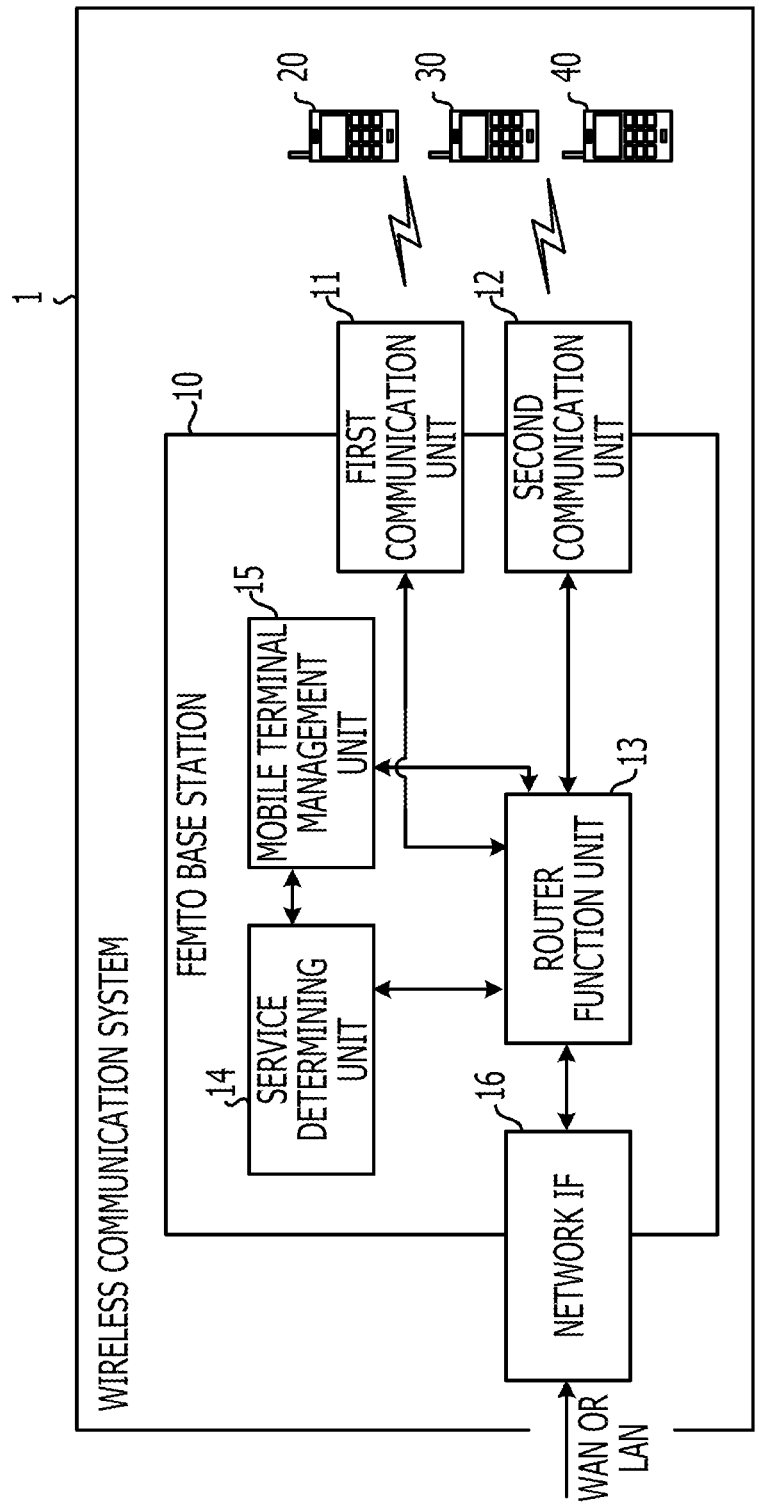
FIG. 1 illustrates the functional configuration of a femto base station.

However, in the case where a femto base station adopts the HOM method, sometimes, depending on the number of guests that are connected to the femto base station, a subscriber may not be able to receive services with a requested frequency bandwidth and quality of service (QoS). For example, in the case where two subscribers and eight guests are connected via a wireless LAN to a femto base station having both LTE and local area network (LAN) functions, the bandwidth and service quality provided to the subscribers may be limited depending on the presence of the guests. Thus, a user who is a subscriber may not be able to watch a movie that would normally be able to be received at 50 Mbps via the femto base station. There is a method that aims to solve this problem by alternatively allocating bandwidth and QoS for guests to subscribers, but with this method, there is a problem that, not only is the quality of communication for guests deteriorated, but also the quality of communication is deteriorated for both subscribers and guests who are conference attendees in an environment in which there is a large unspecified number of mobile terminals connected to the femto base station.

Technologies of this disclosure were made in light of the above-described problem and an object of this disclosure is to provide a base station, a wireless communication system and a wireless communication method that can satisfy requests from subscribers while still maintaining communication with guests.

Hereafter, embodiments of a base station, a wireless communication system and a wireless communication method disclosed in this application will be described in detail while referring to the drawings. However, base stations, wireless communication systems and wireless communication methods disclosed in this application are not limited by the embodiments.

Embodiment 1

First, the configuration of a wireless communication system according to an embodiment disclosed in the present application will be described. A wireless communication system 1 includes at least a femto base station 10, a subscriber 20 and guests 30 and 40. The subscriber 20 and the guests 30 and 40 are all portable terminals capable of performing communication using a plurality of wireless communication schemes (for example, schemes for cellular phones such as LTE and 3G, and WiFi (registered trademark) and bluetooth). The subscriber 20 is a mobile terminal that is registered with the femto base station 10, whereas the guests 30 and 40 are mobile terminals that are not registered with the femto base station 10. However, regardless of whether or not they are registered, the subscriber 20 and the guests 30 and 40 are all capable of communicating with the femto base station 10 by using a plurality of wireless communication schemes.

FIG.FIG. 1 illustrates the functional configuration of the femto base station 10. As illustrated in FIG.FIG. 1, the femto base station 10 includes a first communication unit 11, a second communication unit 12, a router function unit 13, a service determining unit 14, a mobile terminal management unit 15 and a network interface (IF) 16. These constituent components are connected so as to be capable of being input with and capable of outputting signals and data in one direction or both directions.

The first communication unit 11 employs bluetooth as a wireless communication scheme to perform communication with the subscriber 20 and the guests 30 and 40. The second communication unit 12 employs LTE as a wireless communication scheme to perform communication with the subscriber 20 and the guests 30 and 40. When there are service requests from the subscriber 20 and the guests 30 and 40, the router function unit 13 performs control to switch wireless communication schemes of the individual mobile terminals as appropriate in order to satisfy service requests from the subscriber 20. The control of switching wireless communication schemes is preferentially executed for requests from the subscriber 20 over requests from the guests 30 and 40 on the basis of the service levels of detected service requests. Thus, the router function unit 13 secures a certain communication quality, for example, in terms of throughput, permitted transmission delay or guaranteed bandwidth, for the subscriber 20.

For example, upon receiving notification of the ID and classification of a mobile terminal, which is the transmission origin of a service request, from the router function unit 13, the service determining unit 14 notifies the mobile terminal management unit 15, which will be described below, of the service request. The mobile terminal management unit 15 makes a request to the router function unit 13 for notification of a wireless communication scheme which is a handover destination of the subscriber 20, which is the transmission origin of the service request. In addition, the mobile terminal management unit 15 instructs handover of the guest 30 to a wireless communication scheme selected by the router function unit 13 as an affirmative response to the router function unit 13. In addition, the mobile terminal management unit 15 updates the wireless communication scheme of the guest 30 from the wireless communication scheme which was the handover origin to the wireless communication scheme which is the handover destination. The network interface (IF) 16 is connected to an external network such as a LAN or a wide area network (WAN) via a wire circuit. The network IF 16 performs transmission and reception of various signals and data in one direction or two directions with another device (such as a radio network controller (RNC) or a home location register (HLR)).

Figure 2:
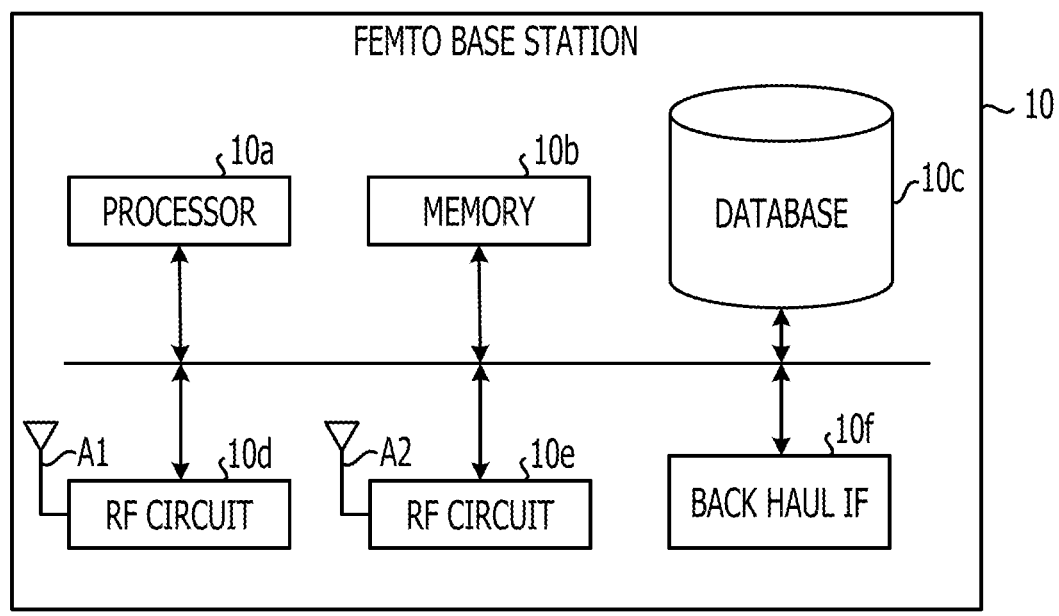
FIG. 2 illustrates the hardware configuration of a femto base station.

Next, the hardware configuration of the femto base station 10 will be described. FIG.FIG. 2 illustrates the hardware configuration of the femto base station 10. As illustrated in FIG.FIG. 2, in the femto base station 10, a processor 10a, a memory 10b, a database 10c, radio frequency (RF) circuits 10d and 10e, a backhaul interface (IF) 10f are connected to each other so as to be capable of being input with and capable of outputting various signals and data via a bus. The processor 10a is for example a central processing unit (CPU) or a digital signal processor (DSP). The memory 10b is a RAM such as a synchronous dynamic random access memory (SDRAM). The database 10c is for example formed of a non-volatile storage device such as a hard disk (HD), a read-only memory (ROM) or a flash memory. The RF circuits 10d and 10e respectively have antennas A1 and A2.

The first communication unit 11 and the second communication unit 12 illustrated in FIG.FIG. 1 are implemented as hardware by using the RF circuits 10d and 10e. In addition, the router function unit 13, the service determining unit 14 and the mobile terminal management unit 15 are implemented as hardware by using the processor 10a. The network IF 16 is implemented as hardware by using the backhaul IF 10f.

Figure 3:
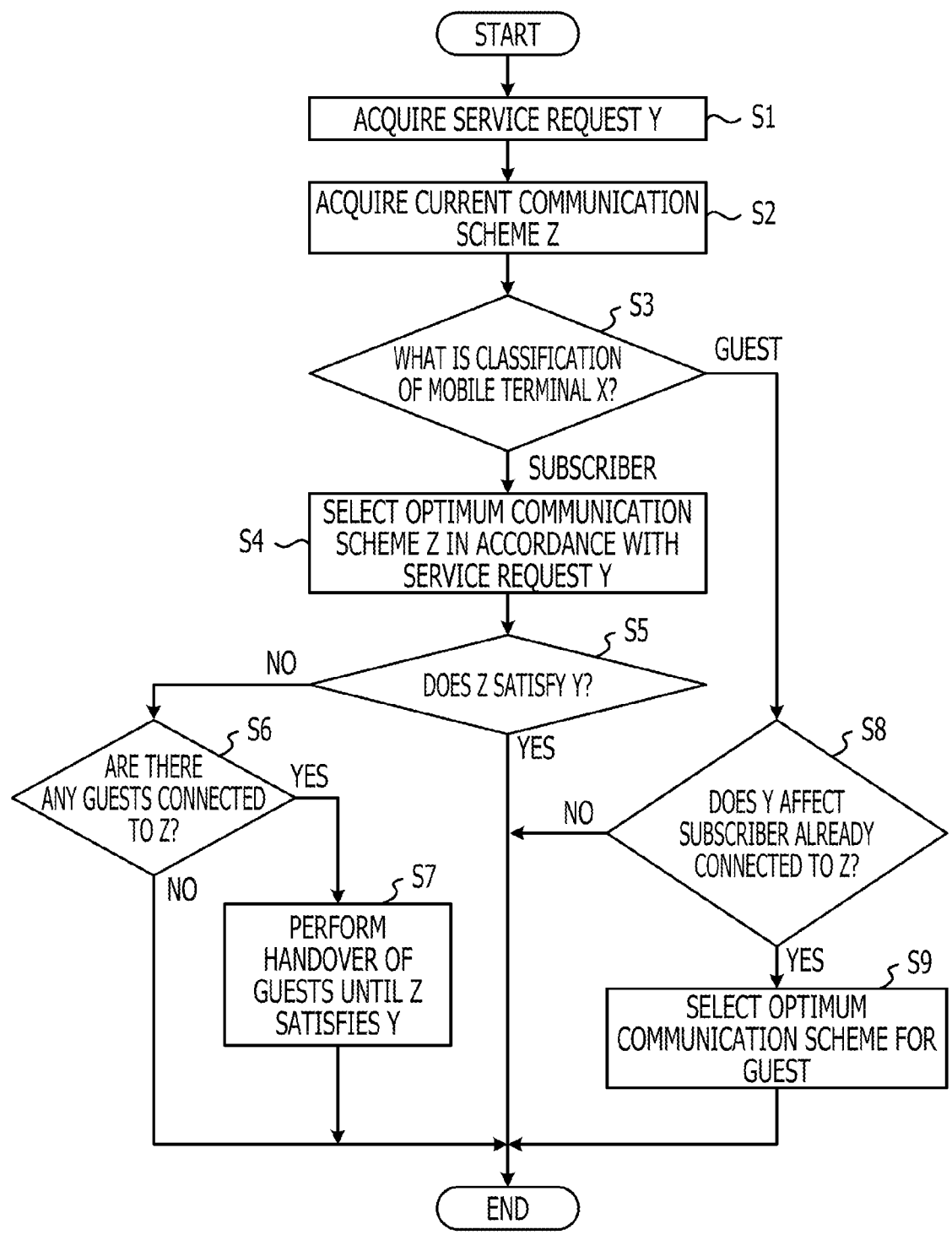
FIG. 3 is a flowchart for explaining the operation of a femto base station in the case where a new service request has been detected in Embodiment 1.

Next, the operation of the femto base station 10 will be described. To facilitate description of the operation, hereafter, as mobile terminals, the subscriber 20 and the guests 30 and 40 will be collectively denoted by "X", service requests to the femto base station 10 from mobile terminals X will be denoted by "Y", and the wireless communication schemes that receive the service requests Y will be denoted by "Z". FIG.FIG. 3 is a flowchart for explaining the operation of the femto base station 10 in the case where a new service request has been detected in Embodiment 1.

First, upon acquiring a service request Y from a mobile terminal X (S1), the processor 10a of the femto base station 10 acquires a wireless communication scheme that is currently being applied to the mobile terminal X, which is the transmission origin of the service request Y, from the database 10c (S2). In S3, the processor 10a determines whether the classification of the mobile terminal X is "subscriber" or "guest" on the basis of the mobile terminal ID included in the service request by referring to the database 10c.

If it is determined that the mobile terminal that is the origin of the service request is the subscriber 20 (S3; subscriber), the processor 10a selects an optimum wireless communication scheme Z for the subscriber 20 in accordance with the service request Y acquired in S1 (S4). In Embodiment 1, a wireless communication scheme having a high throughput and a small transmission delay is preferentially selected as the optimum wireless communication scheme Z. In S5, the processor 10a determines whether or not the wireless communication scheme Z selected in S4 satisfies the service request Y acquired in S1 from the viewpoint of communication speed (S5).

In the case where it is determined in S5 that the wireless communication scheme Z does satisfy the service request Y (S5; Yes), the series of processing operations finishes. On the other hand, in the case where the femto base station 10 has accepted the service request Y of the subscriber 20 but the wireless communication scheme Z does not satisfy the service request Y (S5; No), the processor 10a makes a determination regarding the presence of guests connected to the wireless communication scheme Z (S6). In the case where either of the guests 30 and 40 is connected to the wireless communication scheme Z (S6; Yes), the processor 10a causes the connected guests to be handed over to another wireless communication scheme Z until the wireless communication scheme Z satisfies the service request Y (S7). In the case where there are no guests connected to the wireless communication scheme Z (S6; No), this series of processing operations finishes.

In the case where it is determined in S3 that the mobile terminal that is the origin of the service request Y is either of the guests 30 and 40 (S3; guest), the processor 10a makes a determination as to whether the service request Y can be accepted on the basis of whether the service request Y affects the subscribers that are already connected to the wireless communication scheme Z (S8). In the case where the service request Y can be accepted by the wireless communication scheme Z (S8; No), the processor 10a finishes this series of processing operations without handing over either of the guests 30 and 40, whereas in the case where it is not possible to accept the service request Y (S8; Yes), the processor 10a selects an optimum wireless communication scheme Z for the guest that transmitted the service request Y (S9) and then finishes the processing. In Embodiment 1, even when selecting a wireless communication scheme Z for a guest, a wireless communication scheme having high throughput and a short transmission delay is preferentially selected from the viewpoint of communication speed, the same as for the subscriber 20.

Figure 4:
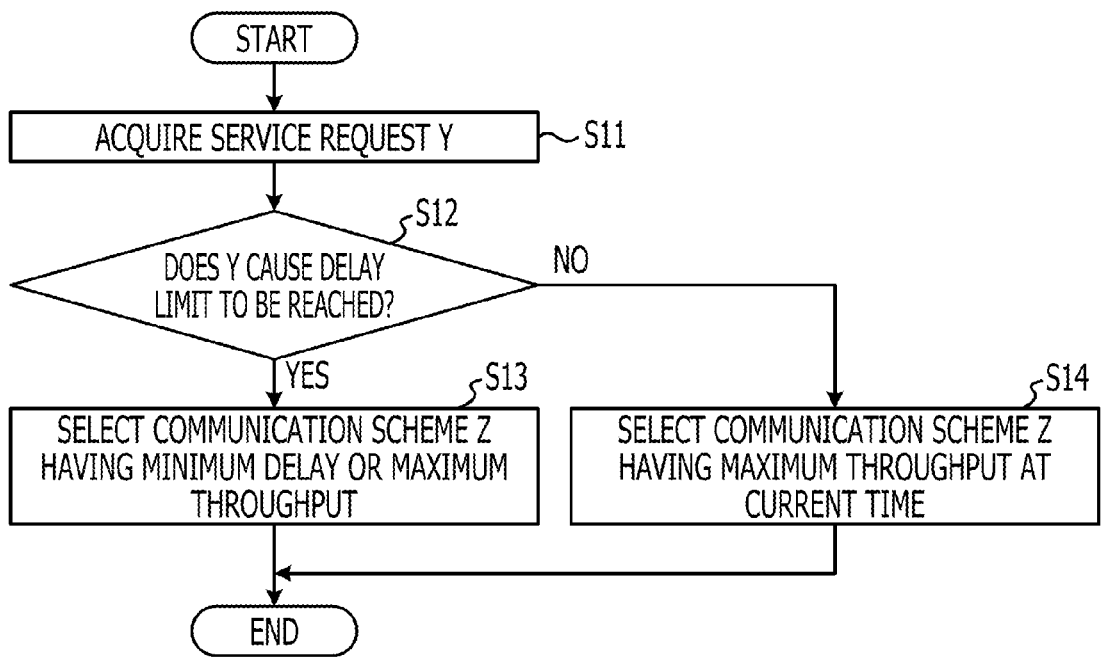
FIG. 4 is a flowchart for explaining processing in which a femto base station selects an optimum communication scheme for a subscriber in Embodiment 1.

Next, the processing of selecting a communication scheme executed in S4 will be described in detail. FIG.FIG. 4 is a flowchart for explaining processing in which the femto base station 10 selects an optimum communication scheme for the subscriber 20 in Embodiment 1. In S11, the processor 10a acquires a service request Y transmitted from the subscriber 20. Next, the processor 10a makes a determination as to whether or not the delay generated by the service requested in the service request Y acquired in S11, has reached a delay limit (S12). In the case where it is determined that the delay has reached the limit (S12; Yes), the processor 10a selects a wireless communication scheme Z that has the smallest delay or has the largest throughput from among the wireless communication schemes Z (for example, LTE) that support the QoS as the connection destination of the subscriber 20 (S13). In contrast, in the case where it is determined in S12 that the delay is within the permitted range (S12; No), the processor 10a selects the wireless communication scheme Z that exhibits the largest throughput at the present time as the connection destination of the subscriber 20 (S14).

Figure 5:
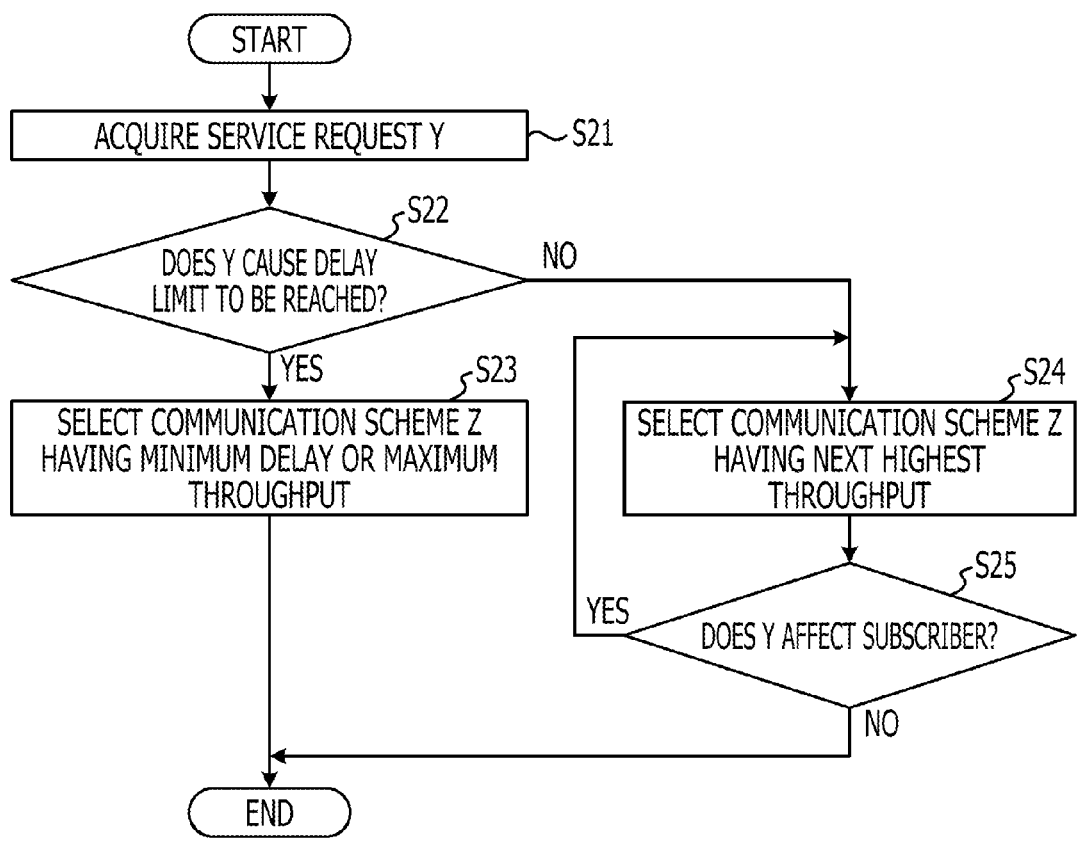
FIG. 5 is a flowchart for explaining processing in which a femto base station selects an optimum communication scheme for a guest in Embodiment 1.

Next, the processing of selecting a communication scheme executed in S9 will be described in detail. FIG.FIG. 5 is a flowchart for explaining processing in which the femto base station 10 selects an optimum communication scheme for the guests 30 and 40 in Embodiment 1. Since the operation of the femto base station 10 illustrated in FIG.FIG. 5 is the same as the operation illustrated in FIG.FIG. 4 except for in the point that the processing of selecting a communication scheme is executed for the guests 30 and 40, common steps will be denoted by reference symbols having the same final digit and detailed description thereof will be omitted. Specifically, steps S21 to S23 in FIG.FIG. 5 respectively correspond to steps S11 to S13 illustrated in FIG.FIG. 4

In the case where the delay that is generated by the service requested in a service request Y from a guest is within the permitted range (S22; No), the processing executed by the femto base station 10 is different in FIG.FIG. 5 and FIG.FIG. 4. That is, in FIG.FIG. 5, the processor 10a selects the wireless communication scheme Z that has the next highest throughput at the current time to the wireless communication scheme Z that was the service request destination requested by the guest 30 or 40 as the connection destination of the guest 30 or 40 (S24). In S25, as the wireless communication scheme Z that is to be the new connection destination for the guest 30 or 40, the processor 10a selects a wireless communication scheme Z for the guest 30 or 40 to connect to on the basis of whether or not the service request Y transmitted from the guest 30 or 40 affects the subscribers that are already connected to that communication scheme (S25).

That is, in the case where the guest 30 or 40 connects to the wireless communication scheme Z selected in S24 and the throughput for a subscriber that is already connected to that wireless communication scheme Z is maintained (S25; No), this series of processing operations finishes. In contrast, in the case where the guest 30 or 40 connects to the wireless communication scheme Z selected in S24 and the request of the subscriber is no longer satisfied (S25; Yes), the processing returns to S24, and the processor 10a selects another different wireless communication scheme Z for the guest 30 or 40. Thus, the guests 30 and 40 can perform communication using a wireless communication scheme having the highest throughput possible for themselves without hindering the communication of a subscriber 20 at a handover destination.

Figure 6:
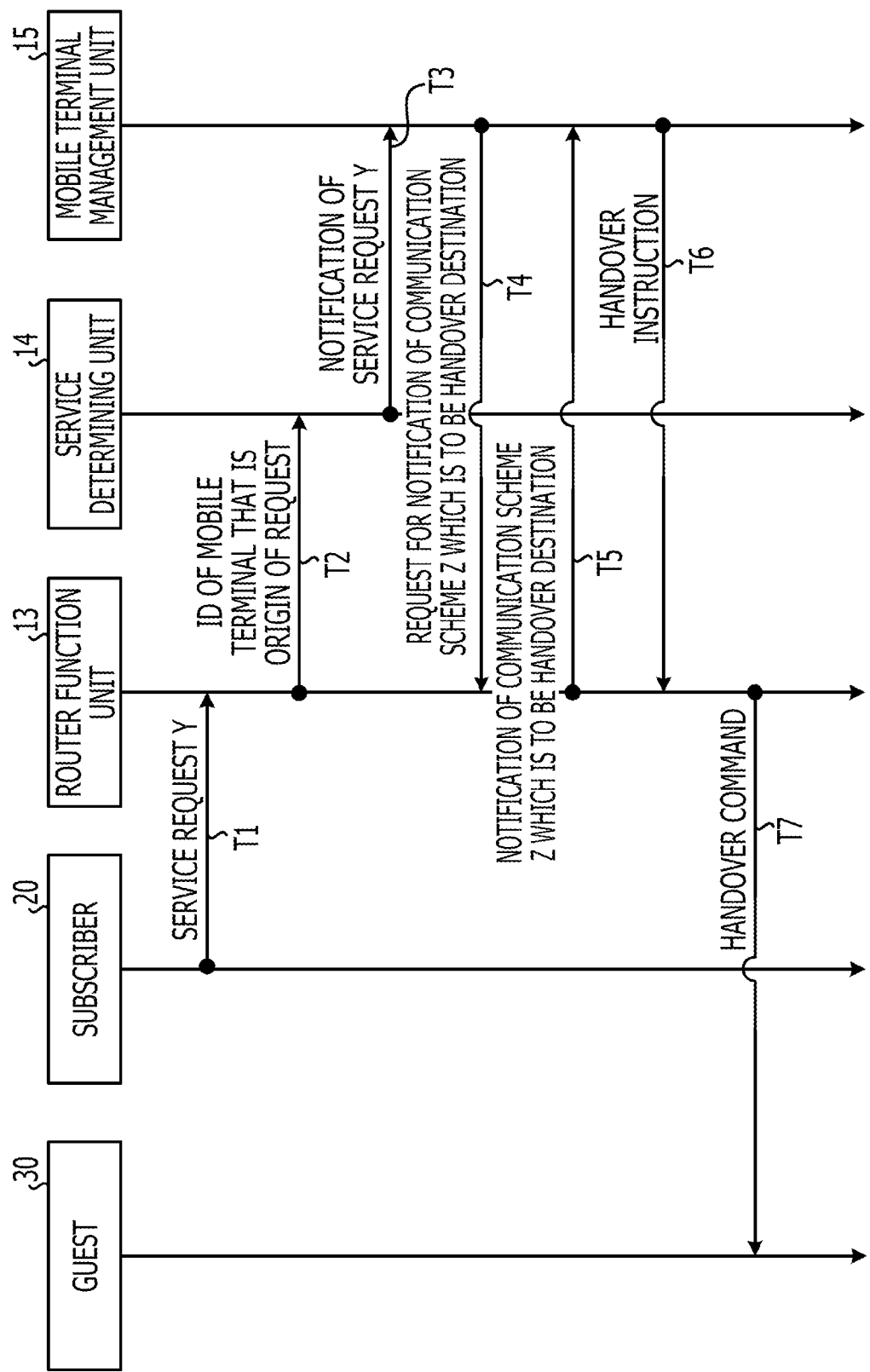
FIG. 6 is a sequence diagram for explaining a situation in which messages are transmitted and received in Embodiment 1.

Next, description will be given of a situation in which messages are transmitted and received in the wireless communication system 1 while referring to FIG.FIG. 6, taking a case in which there is a service request Y made by the subscriber 20, and the guest 30 is handed over as an example. FIG.FIG. 6 is a sequence diagram for explaining a situation in which messages are transmitted and received in Embodiment 1. At T1, the router function unit 13 of the femto base station 10 receives input of a service request Y transmitted from the subscriber 20. The router function unit 13 notifies the service determining unit 14 of the ID and classification of the mobile terminal, which is the transmission origin of the service request Y, as an occurrence of input of a service request Y (T2). Upon receiving this notification from the router function unit 13, the service determining unit 14 notifies the mobile terminal management unit 15 of the service request Y (T3).

Having detected the service request Y, the mobile terminal management unit 15 makes a request to the router function unit 13 for notification of a wireless communication scheme Z which is to be a handover destination for the subscriber 20, which is the transmission origin of the service request Y (T4). At T5, the router function unit 13, along with being input with the notification request, selects a wireless communication scheme Z as a handover destination in order to meet the service level instructed by the service request Y from the subscriber 20 and notifies the mobile terminal management unit 15 of the result of the selection. The mobile terminal management unit 15 instructs handing over of the guest 30 to the wireless communication scheme Z selected by the router function unit 13 as an affirmative response to the router function unit 13 (T6). In addition, the mobile terminal management unit 15 updates the wireless communication scheme Z of the guest 30 in the database 10c from the wireless communication scheme which was the handover origin to the wireless communication scheme which is the handover destination. After the wireless communication scheme has been updated, the router function unit 13, which has received input of the handover instruction from the mobile terminal management unit 15, commands switching of the wireless communication scheme Z for the guest 30 (handover) (T7).

As described above, the wireless communication system 1 includes the femto base station 10, which performs communication with the subscriber 20 and the guests 30 and 40 using bluetooth or LTE, and the subscriber 20 and the guests 30 and 40, which perform communication with the femto base station 10. The femto base station 10 performs communication with the subscriber 20 and the guests 30 and 40 using bluetooth or LTE. The femto base station 10 includes the first communication unit 11 and the router function unit 13. The first communication unit 11 receives a request made to the femto base station 10 from the subscriber 20, which is registered with the femto base station 10. The router function unit 13 allows communication to be performed with the subscriber 20 using bluetooth in accordance with the request. In the case where communication with the subscriber 20 does not satisfy the request, the router function unit 13 performs control to change the communication scheme of the guest 30, which is not registered with the femto base station 10, to LTE from bluetooth. Here, in Embodiment 1, the request is that communication between the subscriber 20 and the femto base station 10 satisfy a certain communication quality.

That is, in this embodiment, a communication environment is assumed in which the areas of different wireless communication schemes in the area surrounding the femto base station 10 exist in an overlapping manner. In the communication environment, in the case where it is not possible to secure the guaranteed bandwidth for the subscriber 20, which is guaranteed in order to satisfy the service request (QoS) from the subscriber 20, the femto base station 10 hands over the guests 30 and 40. Thus, the femto base station 10 can secure resources for the subscriber 20 so as to satisfy the service request without compromising the service level of the subscriber 20. As a result, a congested state is relieved. However, handover of the guests 30 and 40 may be temporary and in the case where it becomes possible for the guests 30 and 40 to be accepted again, the femto base station 10 can accept joining of the guests 30 and 40. In other words, the femto base station 10 selects wireless communication schemes for the subscriber 20 and the guests 30 and 40 on the basis of various services requested by the subscriber (for example, bandwidth, voice over Internet protocol (VoIP), and video). For example, in the case where it is not possible to maintain the service level requested by the subscriber, the femto base station 10, which received the service request, preferentially secures a requested bandwidth for a service level for the subscriber. As a result, in a case where it is desirable to switch the guests 30 and 40 to another wireless communication scheme (handover), the femto base station 10 excludes the guests 30 and 40 using forced handover. However, in the case where bandwidth for a subscriber can be secured without refusing connection of the guests 30 and 40, the femto base station 10 performs communication with the individual mobile terminals using the former wireless communication schemes without handing over the guests 30 and 40. Therefore, the femto base station 10 can satisfy the service request from the subscriber 20 while maintaining communication with the guests 30 and 40.

Embodiment 2

Next, Embodiment 2 will be described. The configuration of a wireless communication system according to Embodiment 2 is the same as the configuration of the wireless communication system according to Embodiment 1 illustrated in FIG.FIG. 1. Furthermore, the configuration of a femto base station according to Embodiment 2 is the same as the configuration of the femto base station according to Embodiment 1 illustrated in FIG.FIG. 1. Therefore, in Embodiment 2, constituent elements common to Embodiment 1 are denoted by the same reference symbols and detailed description thereof is omitted. Embodiment 2 is different from Embodiment 1 in terms of the evaluation criteria used to select an optimum wireless communication scheme for the subscriber 20. Specifically, in Embodiment 1, the femto base station 10 selects a wireless communication scheme having a higher communication speed as the optimum communication scheme for the subscriber 20, whereas in Embodiment 2, the femto base station 10 selects a wireless communication scheme with which a greater amount of power can be saved as the optimum wireless communication scheme. Hereafter, operation of the femto base station 10 according to Embodiment 2 will be described while focusing on points that are different from Embodiment 1 and while referring to FIGS. 7 to 10.

Figure 7:
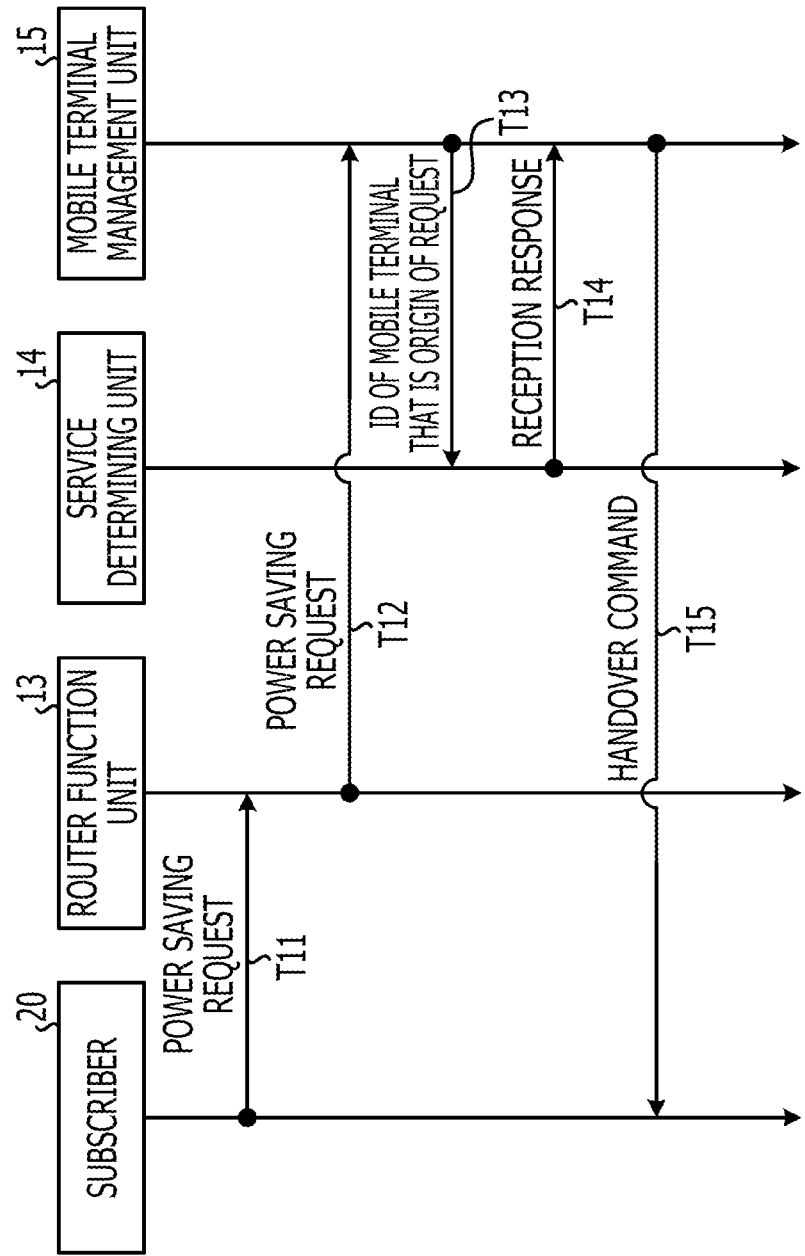
FIG. 7 is a sequence diagram for explaining a situation in which messages are transmitted and received in Embodiment 2.

FIG.FIG. 7 is a sequence diagram for explaining a situation in which messages are transmitted and received in Embodiment 2. At T11, the router function unit 13 of the femto base station 10 receives input of a power saving request transmitted from the subscriber 20. A power saving request may instead be transmitted from the guest 30. Upon receiving the power saving request, the router function unit 13 transfers the request to the mobile terminal management unit 15 without the request going via the service determining unit 14 (T12). The mobile terminal management unit 15 acquires the ID and classification of the mobile terminal that is the transmission origin of the request from the request as an occurrence of input of a power saving request and notifies the service determining unit 14 of this information (T13). Upon receiving a reception response from the service determining unit 14 (T14), the mobile terminal management unit 15 updates the wireless communication scheme Z of the subscriber 20, which is the origin of the power saving request, from the wireless communication scheme which is the handover origin to the wireless communication scheme which is the handover destination in the database 10c. After updating of the wireless communication scheme, the mobile terminal management unit 15 commands switching of the wireless communication scheme Z (handover) for the subscriber 20, which is the origin of the power saving request (T15). Thus, it is possible for the subscriber 20 to connect to a wireless communication scheme with which less power is consumed by the terminal.

Figure 8:
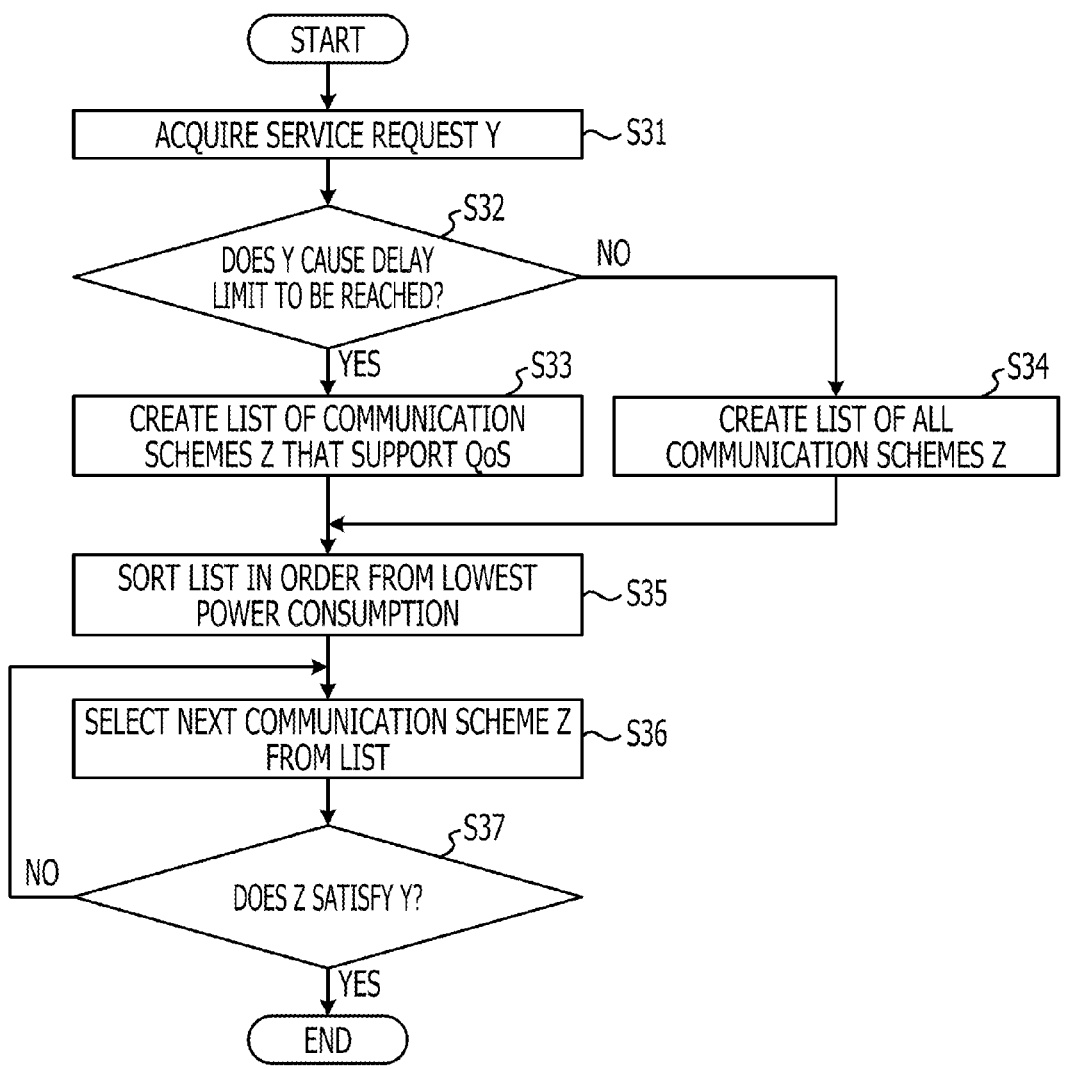
FIG. 8 is a flowchart for explaining processing in which a femto base station selects an optimum communication scheme for a subscriber in Embodiment 2.

FIG.FIG. 8 is a flowchart for explaining processing in which the femto base station 10 selects an optimum communication scheme for the subscriber 20 in Embodiment 2. Since FIG.FIG. 8 includes steps that are common to FIG.FIG. 4 referred to in description of the operation in Embodiment 1, these common steps will be denoted by reference symbols having the same final digits and detailed description thereof will be omitted. Specifically, steps S31 and S32 of FIG.FIG. 8 respectively correspond to steps S11 and S12 illustrated in FIG.FIG. 4.

In the case where it is determined in S32 that the transmission delay has reached the limit (S32; Yes), in S33, the processor 10a creates a list of wireless communication schemes Z that support the QoS and stores the list in the database 10c. On the other hand, in the case where it is determined in S32 that the transmission delay is within the permitted range (S32; No), the processor 10a creates a list of all the wireless communication schemes Z that can be provided by the femto base station 10 at the current time and stores the list in the database 10c (S34).

In S35 of FIG.FIG. 8, the processor 10a sorts the wireless communication schemes in the list stored in the database 10c in S33 or S34 in order from the lowest power consumption. An example of a list of wireless communication schemes created at this time is illustrated in FIG.FIG. 9. FIG.FIG. 9 illustrates an example of a list of communication schemes according to Embodiment 2. As illustrated in FIG.FIG. 9, as wireless communication schemes, bluetooth, which has the lowest power consumption at 2 mW, LTE, which has a power consumption of 10 mW, and wireless LAN, which has the largest power consumption at 20 mW, are stored in ascending order of power consumption. Therefore, the processor 10a selects the topmost wireless communication scheme Z in the communication scheme list L1, whereby the wireless communication scheme having the lowest power consumption can be selected (S36). However, in the case where the wireless communication scheme Z does not satisfy the service request Y acquired in S31 (S37; No), the processor 10a selects the wireless communication scheme having the next lowest power consumption (S36). When a wireless communication scheme Z that satisfies the service request Y is selected (S37; Yes), the series of processing operations finishes.

Figure 10:
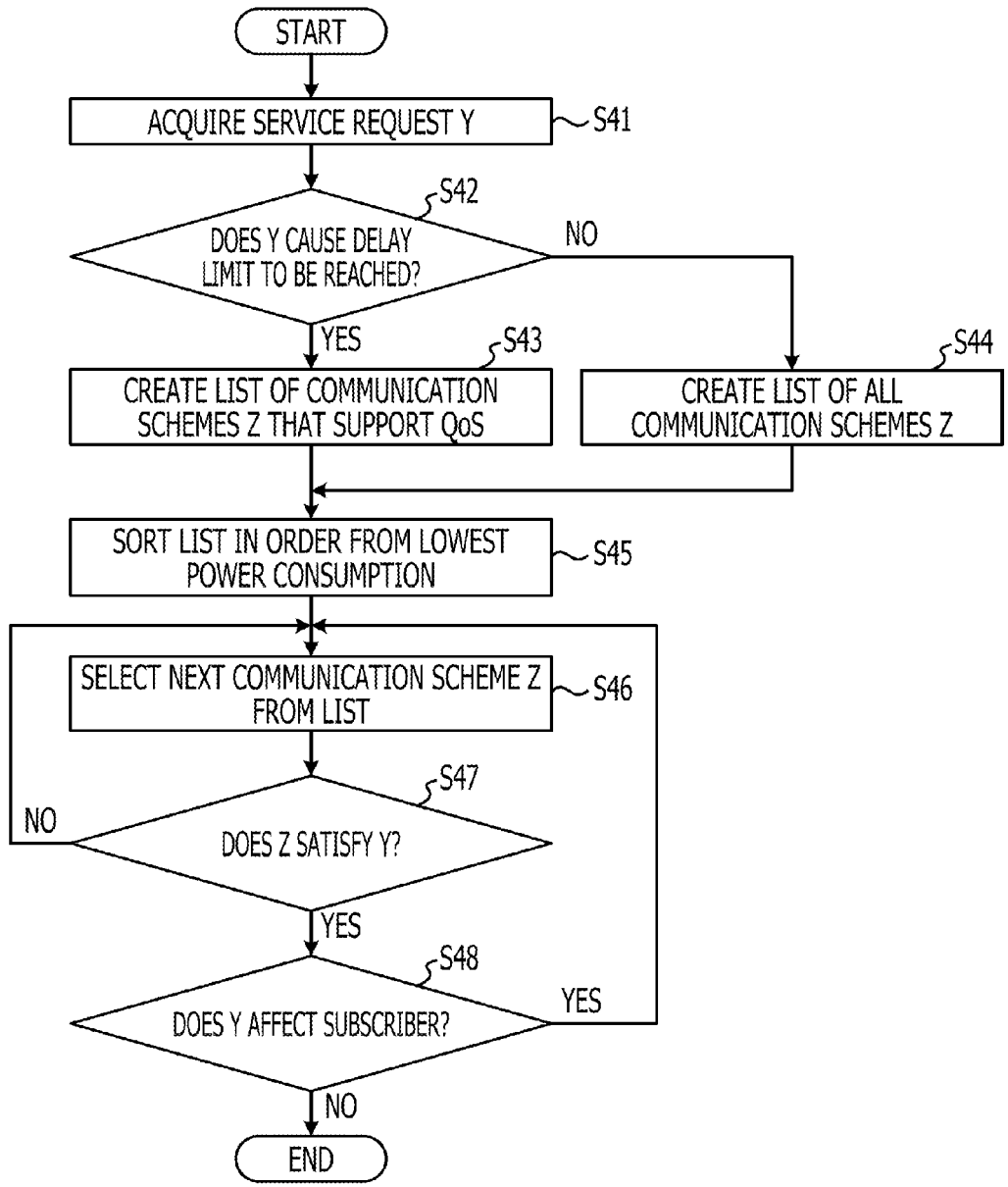
FIG. 10 is a flowchart for explaining processing in which a femto base station selects an optimum communication scheme for a guest in Embodiment 2.

The series of processing operations is similarly executed for the guests 30 and 40. FIG.FIG. 10 is a flowchart for explaining processing in which the femto base station 10 selects an optimum communication scheme for the guests 30 and 40 in Embodiment 2. FIG.FIG. 10 is the same as FIG.FIG. 8 referred to in the description of the operation in this embodiment except for the processing of S48, and therefore common steps will be denoted by reference symbols having the same final digits and detailed description thereof will be omitted. Specifically, steps S41 to S47 of FIG.FIG. 10 respectively correspond to steps S31 to S37 illustrated in FIG.FIG. 8. In S48 of FIG.FIG. 10, the processor 10a of the femto base station 10 determines whether or not the service request Y from the guest 30 or 40 acquired in S41 affects the service request of the subscriber 20 (S48). In the case where there is not an effect (S48; No), the processor 10a finishes the series of processing operations, whereas in the case where there is an effect (S48; Yes), the processor 10a prioritizes the service request of the subscriber 20 and selects the next wireless communication scheme Z candidate from the communication scheme list L1 (S46). The processing of selecting a wireless communication scheme Z is repeatedly executed until the service request Y from the guest 30 or 40 does not affect the subscriber 20, and at a time when a wireless communication scheme Z is selected that does not affect the subscriber 20 (S48; No), the processing finishes.

As described above, the wireless communication system 1 includes the femto base station 10, which performs communication with the subscriber 20 and the guests 30 and 40 using bluetooth or LTE, and the subscriber 20 and the guests 30 and 40, which perform communication with the femto base station 10. The femto base station 10 performs communication with the subscriber 20 and the guests 30 and 40 using bluetooth or LTE. The femto base station 10 includes the first communication unit 11 and the router function unit 13. The first communication unit 11 receives a request made to the femto base station 10 from the subscriber 20, which is registered with the femto base station 10. The router function unit 13 allows communication to be performed with the subscriber 20 using bluetooth in accordance with the request. In the case where communication with the subscriber 20 does not satisfy the request, the router function unit 13 performs control to change the communication scheme of the guest 30, which is not registered with the femto base station 10, to LTE from bluetooth. Here, in Embodiment 2, the request is that power consumption due to communication between the subscriber 20 and the femto base station 10 be reduced. The power consumption to be reduced may be power consumed by the subscriber 20 or may be power consumed by the femto base station 10.

Figure 11:
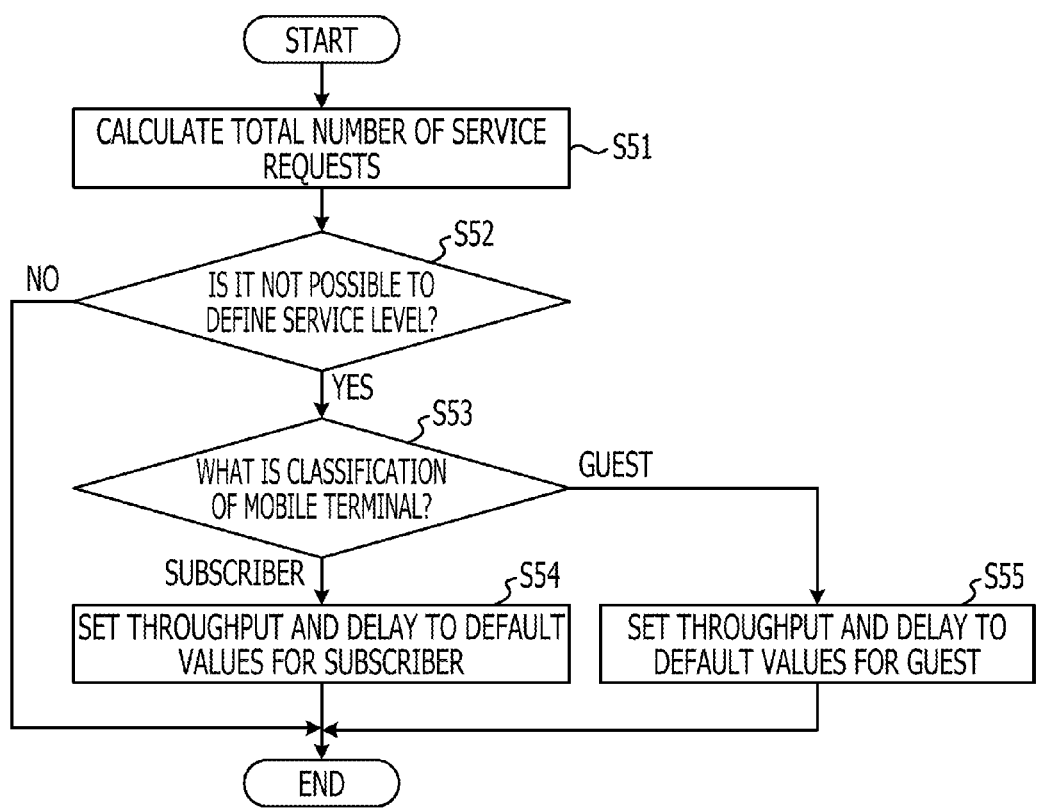
FIG. 11 is a flowchart for explaining service request acquisition processing in Modification 1.

Here, FIG.FIG. 11 is a flowchart for explaining service request acquisition processing in Modification 1. Modification 1 concerns an aspect of the femto base station 10 for a case in which it is not possible to define a service level and can be applied to either of the above-described Embodiments 1 and 2.

The service request acquisition processing is executed in the processing illustrated in S1 of FIG.FIG. 3. First, in S51, the processor 10a calculates total number of detected service requests Y. Next, the processor 10a determines whether it is not possible to define the service level (S52), and in the case where it is possible to define the service level (S52; No), the processing finishes, whereas in the case where it is not possible to define the service level (S52; Yes), the processor 10a determines the classification of the mobile terminal that is the origin of the request (S53). In the case where it is determined that the mobile terminal that is the transmission origin of the service request Y is the subscriber 20, the processor 10a sets the throughput and transmission delay to default values for a subscriber terminal (S54). On the other hand, in the case where the mobile terminal that is the transmission origin of the service request Y is either of the guests 30 and 40, the processor 10a sets the throughput and transmission delay to default values for a guest terminal (S55). Thus, even in the case where it is not possible to determine the service level from the service request Y, the femto base station 10 can select the optimum wireless communication scheme for each mobile terminal regardless of the classification of the mobile terminal. Therefore, the number of service requests Y that can be handled by the femto base station 10 is increased. As a result, the flexibility and versatility of the wireless communication system 1 are improved.

The default values of the service levels can be set in advance by the user or operator of the femto base station 10.

Embodiment 3

Next, Embodiment 3 will be described. The configuration of a wireless communication system according to Embodiment 3 is the same as that of the wireless communication system according to Embodiment 1 illustrated in FIG.FIG. 1. Furthermore, the configuration of a femto base station according to Embodiment 3 is the same as the configuration of the femto base station according to Embodiment 1 illustrated in FIG.FIG. 1. Therefore, in Embodiment 3, constituent elements common to Embodiment 1 are denoted by the same reference symbols and detailed description thereof is omitted. In Embodiment 3, a case is assumed in which a mobile terminal is newly connected to the femto base station, and Embodiment 3 can be applied to the above-described Embodiments 1 and 2. Hereafter, operation of a femto base station 10 according to Embodiment 3 will be described with reference to FIG.FIG. 12 and FIG.FIG. 13.

Figure 12:
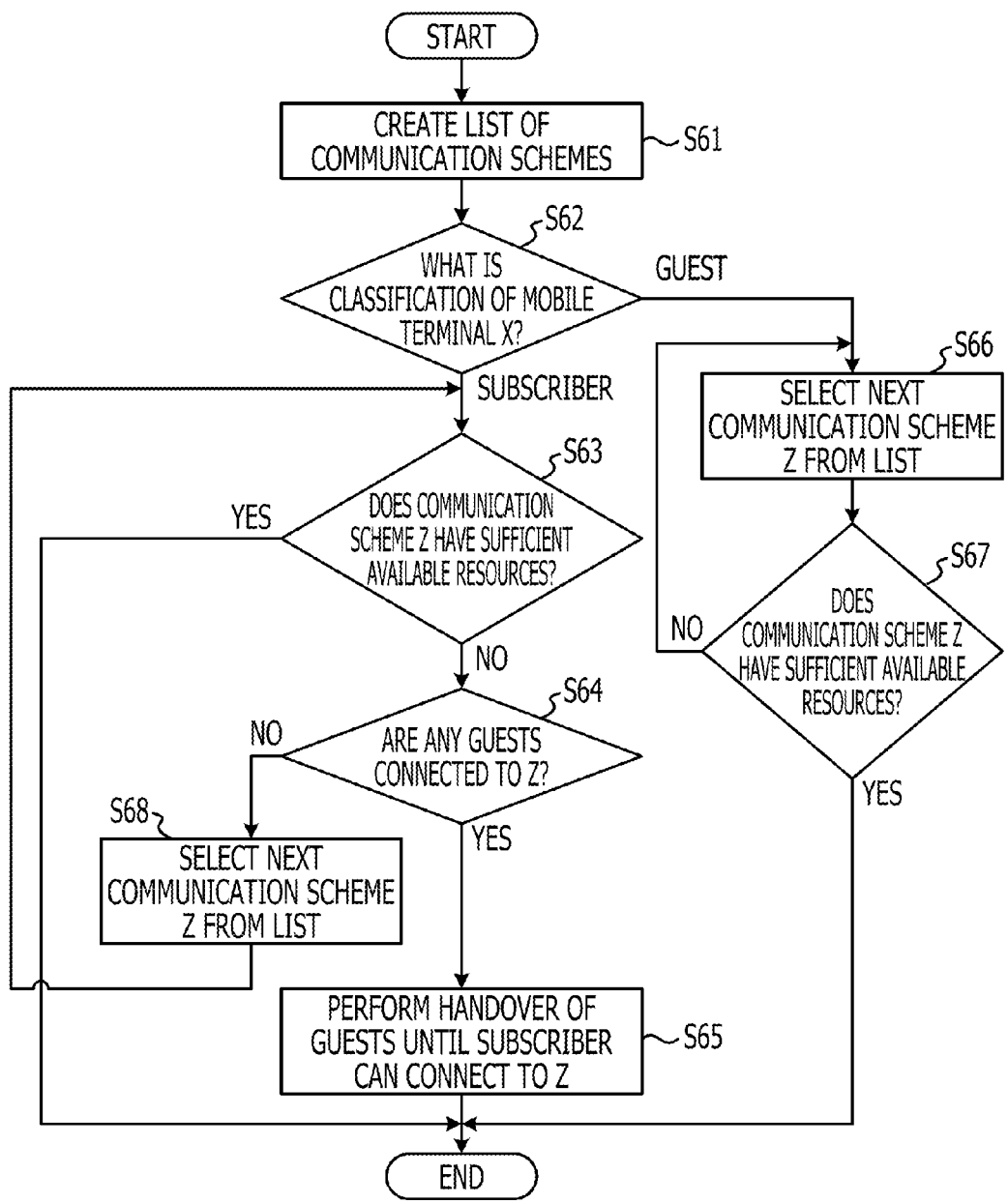
FIG. 12 is a flowchart for explaining operation of a femto base station according to Embodiment 3.

FIG.FIG. 12 is a flowchart for explaining operation of the Femto base station 10 according to Embodiment 3. In S61, the processor 10a creates in the database 10c a communication scheme list L2 in which wireless communication schemes are associated with power consumption, access time, number of connected mobile terminals, and number of open spots. The communication scheme list L2 created at this time is illustrated in FIG.FIG. 13. FIG.FIG. 13 illustrates an example of the communication scheme list L2 according to Embodiment 3. As illustrated in FIG.FIG. 13, for example, "0.02 mW" is stored as the power consumption in an idle mode and "200 ms" is stored as the access time for the bluetooth wireless communication scheme. In addition, "2" is stored as the number of connected mobile terminals and "10" is stored as the number of open spots. Similarly, values of "0.5 mW", "70 ms", "0", and "4" are respectively stored for LTE and values of "1 mW", "50 ms", "8", and "20" are respectively stored for wireless LAN.

In S62, the processor 10a determines the classification of the mobile terminal X from among "subscriber" and "guest" on the basis of the mobile terminal ID included in a connection request. In the case where it is determined that the mobile terminal X that has requested connection is the subscriber 20 (S62; subscriber), the processor 10a determines whether or not there are sufficient available resources in the wireless communication scheme Z to which connection has been requested (S63). In the case where there are sufficient available resources (S63; Yes), the processor 10a accepts the request from the subscriber 20, connects the subscriber 20 to the wireless communication scheme Z, and then the processing finishes. On the other hand, in the case where there are not sufficient available resources (S63; No), the processor 10a determines whether there are guests connected to the wireless communication scheme Z at the current time (S64). In the case where it is determined that there are guests connected to the wireless communication scheme Z (S64; Yes), the processor 10a performs handover of the guests to another optimum wireless communication scheme Z until the subscriber 20 that has requested connection can connect to the wireless communication scheme Z (S65).

In the case where it is determined in S62 that the mobile terminal that is the origin of the connection request is either of the guests 30 and 40 (S62; guest), the processor 10a selects the uppermost wireless communication scheme Z in the communication scheme list L2 (for example, LTE in FIG.FIG. 13) (S66). In S67, the processor 10a determines whether there are sufficient available resources to allow the guest to connect to the wireless communication scheme Z which is the candidate handover destination selected in S66. In the case where there are sufficient available resources (S67; Yes), the processor 10a accepts the connection request from the guest, connects the guest to the wireless communication scheme Z, and then the processing finishes. In contrast, in the case where there are not sufficient available resources to allow the guest that was the origin of the connection request to be accepted by the wireless communication scheme Z selected as a handover destination candidate in S66 (S67; No), the processor 10a selects the next most optimum candidate from the communication scheme list L2 (for example, wireless LAN in FIG.FIG. 13). The processing of S66 and S67 is repeatedly executed until the wireless communication scheme Z which is to be the connection destination of the guest is determined, and as a result, the guest comes to be connected to an optimum wireless communication scheme for which the request of the subscriber 20 is not affected. In the case where there are not sufficient available resources in any of the wireless communication schemes Z, connection of the guest to the femto base station 10 is refused.

In addition, in the case where it is determined in S64 that there are no guests connected to the wireless communication scheme Z (S64; No), the processor 10a executes the same processing as in the above-described S66. That is, the processor 10a selects the next candidate (for example, LTE in FIG.FIG. 13) to the wireless communication scheme Z (for example, bluetooth in FIG.FIG. 13) which was a target for determination of sufficient available resources in S63 as a candidate handover destination from the communication scheme list L2 (S68). Then, returning again to S63, the processor 10a repeats the processing from S63 onwards.

That is, the femto base station 10 determines necessity of handover for each mobile terminal in accordance with the classification of the mobile terminal that is the origin of a service request, the amounts of available resources in the wireless communication schemes Z and whether there are guests connected to the wireless communication schemes Z. At this time, the femto base station 10 preferentially connects the subscriber 20 over the guests 30 and 40 as in Embodiments 1 and 2. The femto base station 10 hands over the guests 30 and 40 that affect the provision of services to the subscriber 20 to another wireless communication scheme Z as appropriate so as to satisfy the service request from the subscriber 20. In addition, as the wireless communication scheme Z which is the handover destination of the guests 30 and 40, an optimum wireless communication scheme is selected for each of the guests while taking into consideration for example the power consumption, the access time and the number of connected mobile terminals described in the communication scheme list L2. Thus, even in the case where a new user connects to the femto base station 10, regardless of the classification of the mobile terminal, an optimum wireless communication scheme can be selected for each mobile terminal. Therefore, the number of situations that the femto base station 10 can handle is increased. As a result, the flexibility and versatility of the wireless communication system 1 are improved.

Embodiment 4

Next, Embodiment 4 will be described. The configuration of a wireless communication system according to Embodiment 4 is the same as the configuration of the wireless communication system according to Embodiment 1 illustrated in FIG.FIG. 1. Furthermore, the configuration of a femto base station according to Embodiment 4 is the same as the configuration of the femto base station according to Embodiment 1 illustrated in FIG.FIG. 1. Therefore, in Embodiment 4, constituent elements common to Embodiment 1 are denoted by the same reference symbols and detailed description thereof is omitted. Embodiment 4 is different from Embodiment 1 in terms of the evaluation criteria used to select optimum wireless communication schemes for the subscriber 20 and the guests 30 and 40. Specifically, in Embodiment 1, the femto base station 10 selects a wireless communication scheme having a higher communication speed as an optimum communication scheme for the subscriber 20, whereas in Embodiment 4, the femto base station 10 selects a wireless communication scheme to which a greater number of mobile terminals are connected as an optimum wireless communication scheme. Hereafter, operation of the femto base station 10 according to Embodiment 4 will be described with reference to FIGS. 14 to 16 while focusing on points that are different from Embodiment 1.

Figure 14:
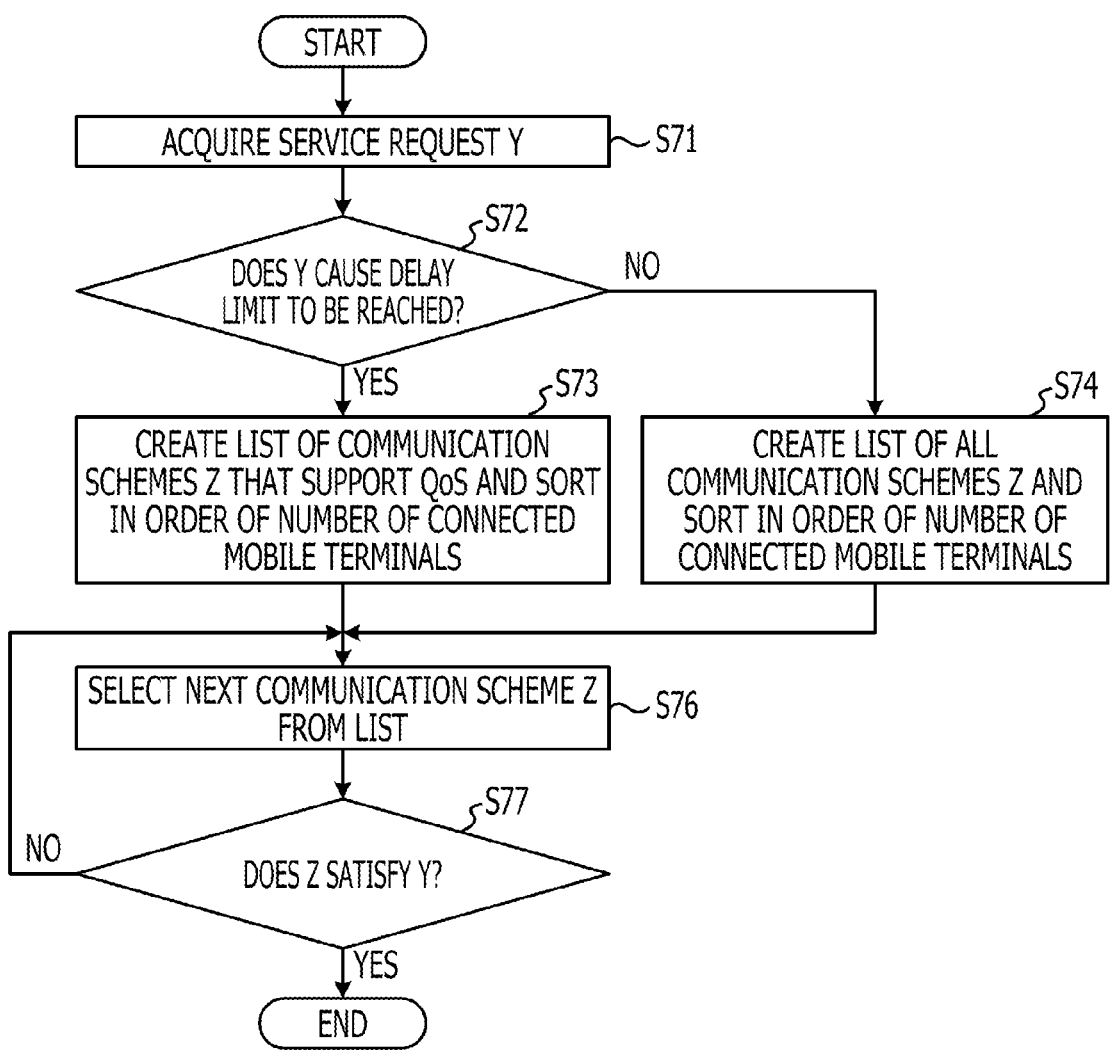
FIG. 14 is a flowchart for explaining processing in which a femto base station selects an optimum communication scheme for a subscriber in Embodiment 4.

FIG. FIG. 14 is a flowchart for explaining processing in which the femto base station 10 selects an optimum communication scheme for the subscriber 20 in Embodiment 4. Since FIG. FIG. 14 includes steps that are common to FIG. FIG. 8 referred to in the description of the operation in Embodiment 1, these common steps will be denoted by reference symbols having the same final digits and detailed description thereof will be omitted. Specifically, steps S71, S72, S76 and S77 in FIG. FIG. 14 respectively correspond to steps S31, S32, S36 and S37 illustrated in FIG. FIG. 8.

Hereafter, the processing executed in steps S73 and S74, which are points of difference between FIG. FIG. 14 and FIG. FIG. 8, will be described. First, in the case where it is determined in S72 that the transmission delay has reached the limit (S72; Yes), in S73, the processor 10a creates a list of wireless communication schemes Z that support the QoS and sorts this list in order from the greatest number of connected mobile terminals (descending order). The created list is stored in the database 10c. An example of a list of wireless communication schemes created at this time is illustrated in FIG. FIG. 15. FIG. FIG. 15 illustrates an example of a communication scheme list L3 according to Embodiment 4. As illustrated in FIG. FIG. 15, the wireless communication schemes are stored in the communication scheme list L3 with the number of connected mobile terminals serving as a parameter. The numbers of connected mobile terminals of the wireless communication schemes (wireless LAN, bluetooth, LTE) at the current time are "8", "2" and "0", respectively, and therefore, wireless LAN, which is the wireless communication scheme for which the number of connected mobile terminals is greatest, is stored at the top of the communication scheme list L3 as the first candidate.

However, in the case where it is determined in S72 that the transmission delay is within the permitted range (S72; No), the processor 10a creates a list of all of the wireless communication schemes Z that can be provided by the femto base station 10 at the current time and sorts the list on the basis of the number of currently connected mobile terminals as in S73 (S74). The communication scheme list L3 sorted in descending order of the number of connected mobile terminals is stored in the database 10c.

Figure 16:
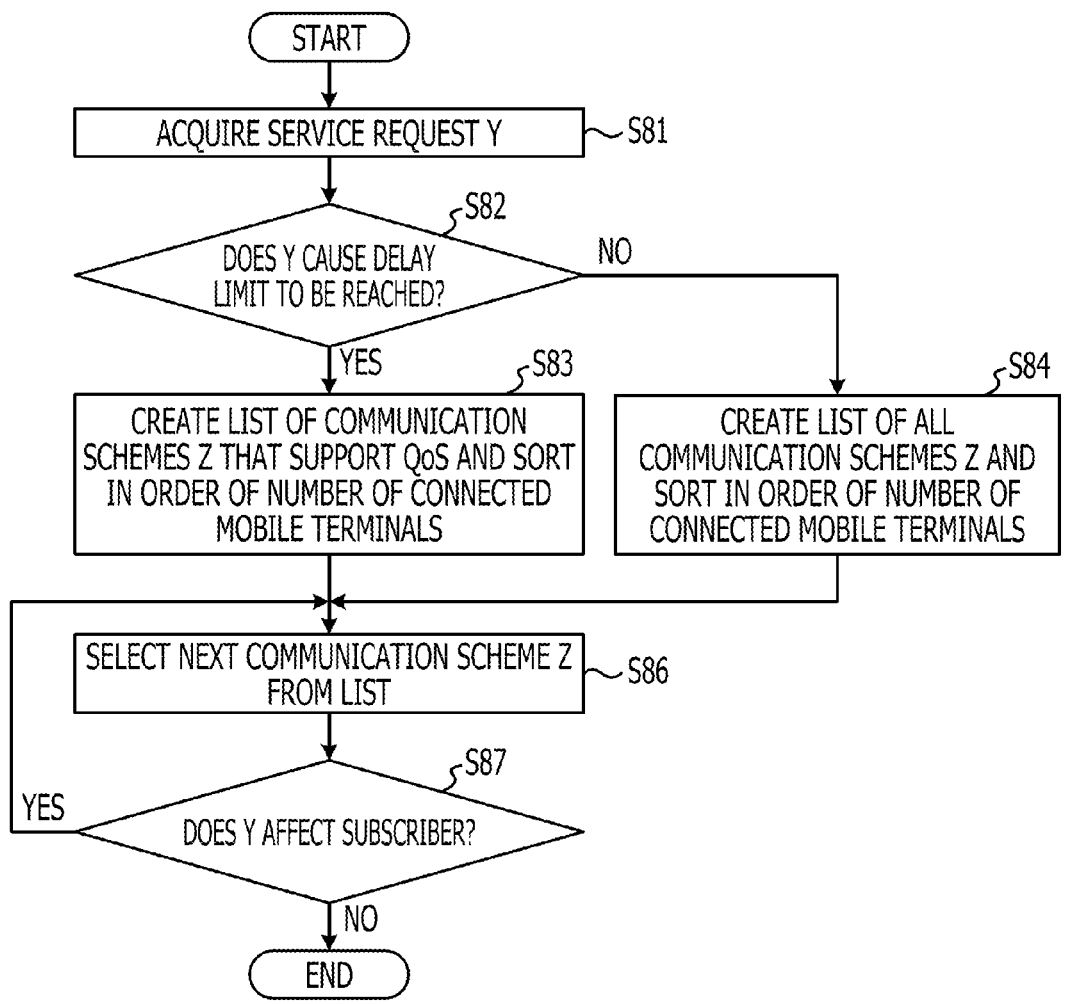
FIG. 16 is a flowchart for explaining processing in which a femto base station selects an optimum communication scheme for a guest in Embodiment 4.

The above series of processing operations (S71 to S77) is also executed for the guests 30 and 40. FIG. FIG. 16 is a flowchart for explaining processing in which the femto base station 10 selects an optimum communication scheme for the guests 30 and 40 in Embodiment 4. The processing operations illustrated in FIG. FIG. 16 are the same as the processing operations described with reference to FIG. FIG. 14, except for the processing operation of S87. Therefore, common steps are denoted by reference symbols having the same final digits and detailed description thereof will be omitted. Specifically, steps S81 to S86 of FIG. FIG. 16 respectively correspond to steps S71 to S76 illustrated in FIG. FIG. 14.

In S87 of FIG. FIG. 16, the processor 10a of the femto base station 10 determines whether or not the service request Y from the guest 30 or 40 acquired in S81 affects the service request from the subscriber 20 (S87). In the case where there is not an effect (S87; No), the processor 10a finishes the series of processing operations, whereas in the case where there is an effect due to the service requests Y (S87; Yes), the processor 10a prioritizes the service request from the subscriber 20 and selects the next most optimum wireless communication scheme Z candidate from the communication scheme list L3. The processing of selecting a wireless communication scheme Z is repeatedly executed until the service request Y from the guest 30 or 40 does not affect the subscriber 20, and at a time when a wireless communication scheme Z is selected that does not affect the subscriber 20 (S87; No), the processing finishes.

As described above, the wireless communication system 1 includes the femto base station 10, which performs communication with the subscriber 20 and the guests 30 and 40 using bluetooth or LTE, and the subscriber 20 and the guests 30 and 40, which perform communication with the femto base station 10. The femto base station 10 performs communication with the subscriber 20 and the guests 30 and 40 using bluetooth or LTE. The femto base station 10 includes the first communication unit 11 and the router function unit 13. The first communication unit 11 receives a request made to the femto base station 10 from the subscriber 20, which is registered with the femto base station 10. The router function unit 13 allows communication to be performed with the subscriber 20 using bluetooth in accordance with the request. In the case where communication with the subscriber 20 does not satisfy the request, the router function unit 13 performs control to change the communication scheme of the guest 30, which is not registered with the femto base station 10, to LTE from bluetooth. Here, in Embodiment 4, the request is that connection be made to a communication scheme to which a greater number of mobile terminals are connected among bluetooth and LTE.

In the wireless communication system 1 according to Embodiment 4, the femto base station 10 sets the optimum wireless communication scheme for each mobile terminal to a wireless communication scheme to which a greater number of mobile terminals are connected. Thus, the wireless communication scheme for which the number of connected mobile terminals is the greatest at the current time (for example, wireless LAN) is selected as the connection destination of the subscriber 20. In addition, the wireless communication scheme for which the number of connected mobile terminals is the greatest and that does not affect the service request from the subscriber 20 (for example, wireless LAN) is selected as the connection destination of the guests 30 and 40. Thus, the connection destinations of the mobile terminals are concentrated into the wireless communication scheme Z for which the number of connected mobile terminals is the greatest regardless of the classification of the mobile terminals, and the number of mobile terminals connected to the other wireless communication schemes (for example, bluetooth and LTE) is decreased. Therefore, the femto base station 10 switches the RF circuit of the wireless communication scheme for which the number of connected mobile terminals has decreased to a power saving mode, or stops supply of electricity to the RF circuit, whereby reduced power consumption can be achieved. As a result, power saving is realized throughout the entirety of the wireless communication system 1.

The number of connected mobile terminals of a wireless communication scheme that is to be a target of power saving does not necessarily have to be "0", and the femto base station 10 may set in advance a threshold for switching to a power saving mode and for example a wireless communication scheme for which the number of connected mobile terminals is two or less may be made a target of power saving. Alternatively, the femto base station 10 may change the power supply level in a stepwise manner in accordance with the number of connected mobile terminals. In this case, the femto base station 10 can perform control so that the usual power is supplied to a wireless communication scheme for which the number of connected mobile terminals is three or more, a wireless communication scheme for which the number of connected mobile terminals is between one and three is switched to a power saving mode, and power supply to wireless communication scheme for which the number of connected mobile terminals is zero is stopped. For example, in FIG.FIG. 15, the number of connected mobile terminals of wireless LAN is "8" and therefore the usual amount of power is supplied to the wireless LAN RF circuit, whereas the number of connected mobile terminals of bluetooth is "2" and therefore the bluetooth RF circuit is switched to the power saving mode. In addition, since there are no mobile terminals connected to the LTE wireless communication scheme, power is not supplied to the LTE RF circuit. Thus, a larger amount of power is supplied to a wireless communication scheme for which the number of connected mobile terminals is larger, that is, for which the amount of power consumed is larger, whereas the supply of power to the wireless communication schemes that do not use as much power is reduced. As a result, it is possible to realize effective power supply control in accordance with the numbers of connected mobile terminals for all of the wireless communication schemes.

In each of the above-described embodiments, a request that communication quality be improved such as improvement of throughput and reduction of transmission delay, a request that power consumption of the femto base station 10 be reduced, or a request that connection be made to a wireless communication scheme for which the number of connected mobile terminals is the greatest was exemplified as a type of service request, which is an opportunity for handover of the guests 30 and 40. However, the types of service request are not limited to these service requests. That is, the femto base station 10 may determine whether a wireless communication scheme of the subscriber 20 is optimum from the viewpoint of things other than the contents of the requests exemplified in the embodiments. That is, the femto base station 10 can also employ for example a request that the cost of communication be reduced, a request that connection be made to a wireless communication scheme that can provide QoS service, or a request that connection be made to a wireless communication scheme that can shorten the access time as a type of service request. In addition, the femto base station 10 may perform handover of the guests 30 and 40 such that a request from the subscriber 20 is satisfied from the viewpoint of, for example, use, bandwidth, microwave range, frequency band of use, reception power intensity, presence of interference or noise, modulation method or ratio of connected mobile terminals. Alternatively, the femto base station 10 may employ a service request requesting that connection be made to a wireless communication scheme for which the ratio of subscribers or guests to the total number of connected terminals is largest or smallest on the basis of the percentages of mobile terminals of the different classifications connected to all of the wireless communication schemes.

In addition, in each of the embodiments, the femto base station 10 is configured to have a function of performing communication using a plurality of different wireless communication schemes. However, the first communication unit 11 and the second communication unit 12 do not necessarily have to belong to a single femto base station and a plurality of base stations that are constructed so as to be separate from each other may be configured so as to have communication units (for example, first communication unit 11 and second communication unit 12) that correspond to different wireless communication schemes. In addition, in each of the above-described embodiments, a case was exemplified in which there are two wireless communication schemes for the communication units of the femto base station 10, but there may be three or more wireless communication schemes and communication units. In addition, the wireless communication schemes are not limited to the above-described LTE, 3G, wireless LAN schemes such as WiFi (registered trademark) and bluetooth and may be for example ZigBee (registered trademark), global system for mobile communications (GSM) (registered trademark), universal mobile telecommunications system (UMTS), high-speed packet access (HSPA), or infrared communication or any combination thereof.

In addition, mobile terminals to be targets of handover between wireless communication schemes are not necessarily limited to guests and may be subscribers. That is, the femto base station 10 sets in advance priorities for subscribers and in the case where it is not possible to satisfy a request from a specific subscriber 20 by handing over a guest, handover of subscribers is performed in order from subscribers having a low priority. However, a handover command for a subscriber may a temporary command that is cancelled once the wireless communication scheme which was the handover origin can satisfy the request from the subscriber 20. In addition, the parameter for determining the priorities of subscribers can be set in various ways on the basis of the order of registration with the femto base station 10, the reception power intensity from the wireless communication scheme that is the handover origin, communication cost, the amount of remaining battery or the amount of remaining memory.

In addition, in an aspect where the femto base station 10 includes communication units corresponding to three or more wireless communication schemes, the handover destinations of guests 30 and 40 that are to be handed over due to a service request from the subscriber 20 do not necessarily have to be the same wireless communication scheme. That is, the femto base station 10 may appropriately change the wireless communication scheme which is to be the handover destination for each guest. As a criterion for determining the wireless communication scheme to be the handover destination, for example, the classification of the service request from the guest, the order of connection to the femto base station 10, the reception power intensity from the wireless communication scheme which is to be the handover destination or the cost of communication at the handover destination can be used. According to this aspect, the femto base station 10 allows a guest that was connected to a wireless communication scheme, which was the handover origin, to be reconnected to a wireless communication scheme that is suitable in terms of the characteristics of the guest in accordance with the characteristics of the guest. Therefore, also at the handover destination, the guest can easily and rapidly adapt to the new wireless communication scheme and excellent communication can be maintained regardless of the schemes before and after handover. As a result, the communication stability and reliability of the wireless communication system 1 is improved.

In each of the above-described embodiments, description has been given under the assumption that the mobile terminals are cellular phones, smart phones or personal digital assistants (PDAs), but the present embodiments are not limited to mobile terminals and can be applied to a variety of communication devices that make service requests to a base station.

In addition, each of the constituent elements of the femto base station 10 illustrated in FIG.FIG. 1 are not necessarily physically structured as they are illustrated. That is, the specific details of separation or integration of each of the devices is not limited to what is illustrated and all of some of the devices can be formed so as to be functionally or physically separated or integrated in desired units in accordance with various loads and conditions of use. For example, the router function unit 13 and the mobile terminal management unit 15 may be combined with each other into a single constituent element. Conversely, the router function unit 13 illustrated in FIG.FIG. 1 may be divided into a section that determines necessity of handover of the guests 30 and 40 in accordance with a service request from the subscriber 20 and a section that commands handover of the guests 30 and 40 in accordance with an instruction from the mobile terminal management unit 15. In addition, the memory 10b may be a device external to the femto base station 10 connected via a network or a cable.

In addition, in the above description, individual configurations and operations were described for each of the embodiments. However, a wireless communication system according to any of the embodiments may share specific constituent elements characteristic to another embodiment or modification. In addition, not only two embodiments and/or modifications may be combined, but embodiments obtained by combining any number of such as three or more embodiments and/or modifications can also be adopted. For example, the wireless communication system 1 according to Embodiment 1 or Embodiment 2 may select a wireless communication scheme for which the number of connected mobile terminals is greater, as in Embodiment 4, as an optimum wireless communication scheme. In addition, the technique of setting the default value described in Modification 1 can be applied to not only to the femto base stations 10 of Embodiments 1 and 2 but also to the femto base stations 10 of Embodiments 3 and 4. In addition, a single wireless communication system may possess all of the constituent elements described in Embodiments 1 to 4 and Modification 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
   a first antenna for a first wireless communication;
   a second antenna for a second wireless communication; and
   a processor
      to receive a request from a registered mobile terminal that is registered with the base station,
      to determine whether a delay limit corresponding to the request is reached;
      to select one of the first wireless communication and the second wireless communication having a minimum delay or a maximum throughput when the delay limit is reached, and select one of the first wireless communication and the second wireless communication having a current maximum throughput when the delay limit is not reached;
      to communicate with the registered mobile terminal by using the selected one of the first wireless communication and the second wireless communication, and
      to control a non-registered mobile terminal that is not registered with the base station, so as to communicate with the base station by using the second wireless communication, when the non-registered mobile terminal communicates with the base station by using the first wireless communication and a condition of a communication performed by the base station is not satisfied.

2. The base station according to the claim 1, wherein the condition relates a quality of the communication between the registered mobile terminal and the base station.

3. The base station according to the claim 1, wherein the condition relates a power of the communication between the registered mobile terminal and the base station.

4. The base station according to the claim 1, wherein the condition relates an available resource of the communication between the registered mobile terminal and the base station.

5. A wireless communication system comprising:
   a base station;
   a registered mobile terminal that is registered with the base station; and
   a non-registered mobile terminal that is not registered with the base station;
   wherein the base station includes
   a first antenna for a first wireless communication,
   a second antenna for a second wireless communication, and
   a processor
      to receive a request from the registered mobile terminal,
      to determine whether a delay limit corresponding to the request is reached;
      to select one of the first wireless communication and the second wireless communication having a minimum delay or a maximum throughput when the delay limit is reached, and select one of the first wireless communication and the second wireless communication having a current maximum throughput when the delay limit is not reached;
      to communicate with the registered mobile terminal by using the selected one of the first wireless communication and the second wireless communication, and
      to control the non-registered mobile terminal, so as to communicate with the base station by using the second wireless communication, when the non-registered mobile terminal communicates with the base station by using the first wireless communication and a condition of a communication performed by the base station is not satisfied.

6. The wireless communication system according to the claim 5, wherein the condition relates a quality of the communication between the registered mobile terminal and the base station.

7. The wireless communication system according to the claim 5, wherein the condition relates a power of the communication between the registered mobile terminal and the base station.

8. The wireless communication system according to the claim 5, wherein the condition relates an available resource of the communication between the registered mobile terminal and the base station.

9. A wireless communication method comprising:
   receiving a request from a registered mobile terminal that is registered with the base station;
   determining whether a delay limit corresponding to the request is reached;
   selecting one of a first wireless communication, which is performed by a first antenna, and a second wireless communication, which is performed by a second antenna, having a minimum delay or a maximum throughput when the delay limit is reached, and selecting one of the first wireless communication and the second wireless communication having a current maximum throughput when the delay limit is not reached;

communicating with the registered mobile terminal by using the selected one of the first wireless communication and the second wireless communication; and controlling a non-registered mobile terminal that is not registered with the base station, so as to communicate with the base station by using the second wireless communication, when the non-registered mobile terminal communicates with the base station by using the first wireless communication and a condition of a communication performed by the base station is not satisfied.

10. The wireless communication method according to the claim 9, wherein the condition relates a quality of the communication between the registered mobile terminal and the base station.

11. The wireless communication method according to the claim 9, wherein the condition relates a power of the communication between the registered mobile terminal and the base station.

12. The wireless communication method according to the claim 9, wherein the condition relates an available resource of the communication between the registered mobile terminal and the base station.

* * * * *